United States Patent
Kim et al.

(10) Patent No.: US 9,378,244 B2
(45) Date of Patent: Jun. 28, 2016

(54) APPARATUS AND METHOD FOR PROCESSING A DATA STREAM

(75) Inventors: Jeong-Ja Kim, Suwon-si (KR); Yeong-Ho Jin, Yongin-si (KR); Ye-Jin Noh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 12/826,529

(22) Filed: Jun. 29, 2010

(65) Prior Publication Data

US 2011/0145221 A1    Jun. 16, 2011

(30) Foreign Application Priority Data

Dec. 11, 2009    (KR) .................. 10-2009-0123326

(51) Int. Cl.
  *G06F 17/30* (2006.01)

(52) U.S. Cl.
  CPC .... *G06F 17/30463* (2013.01); *G06F 17/30545* (2013.01); *G06F 17/3046* (2013.01); *G06F 17/30457* (2013.01)

(58) Field of Classification Search
  CPC ............ G06F 17/30545; G06F 17/30445; G06F 17/30463; G06F 17/3046; G06F 17/30471; G06F 11/1438; G06F 17/30451; G06F 17/30454; G06F 17/30477; G06F 17/30516; G06F 17/30548; G06F 17/30932; G06F 17/30967
  USPC ............. 707/1, 2, 3, 718, 705, 708, 713, 720, 707/769, 802, 719, 759
  See application file for complete search history.

(56) References Cited

U.S. PATENT DOCUMENTS

| | | | | |
|---|---|---|---|---|
| 5,943,666 A * | 8/1999 | Kleewein et al. | ...... | 707/999.002 |
| 6,526,403 B1 * | 2/2003 | Lin et al. | ................ | 707/999.004 |
| 7,395,258 B2 * | 7/2008 | Altinel et al. | .......... | 707/999.003 |
| 7,454,407 B2 * | 11/2008 | Chaudhuri et al. | .... | 707/999.002 |
| 7,577,667 B2 * | 8/2009 | Hinshaw et al. | ......... | 707/999.01 |
| 7,640,230 B2 * | 12/2009 | Hanson et al. | ......... | 707/999.002 |
| 7,702,610 B2 * | 4/2010 | Zane et al. | ............. | 707/999.001 |
| 7,779,031 B2 * | 8/2010 | Grosset et al. | ................ | 707/770 |
| 7,783,900 B2 * | 8/2010 | Hacigumus et al. | .......... | 713/193 |
| 7,818,313 B1 * | 10/2010 | Tsimelzon et al. | ........... | 707/718 |

(Continued)

FOREIGN PATENT DOCUMENTS

| | | |
|---|---|---|
| KR | 10-1997-0013822 | 3/1997 |
| KR | 10-2002-0079327 | 10/2002 |

(Continued)

OTHER PUBLICATIONS

Korean Office Action issued on Aug. 26, 2015 in counterpart Korean Application No. 10-2009-0123326. (7 total pages; 3 pages English, 4 pages Korean).

*Primary Examiner* — Dangelino Gortayo
(74) *Attorney, Agent, or Firm* — NSIP Law

(57) ABSTRACT

An apparatus and method for processing data stream are provided. A query execution plan for processing data stream is shared between the server and the terminal. The server builds a query execution plan and determines a part of the built query execution plan to be executed in the terminal. The terminal executes the part of the built query execution plan and transfers a result of the execution. The server executes the remaining part of the built query execution plan based on the execution result transferred by the terminal. The part of the query execution plan to be executed in the terminal is determined depending on the performance of the terminal.

13 Claims, 5 Drawing Sheets

(56) References Cited

U.S. PATENT DOCUMENTS

| | | | |
|---|---|---|---|
| 7,865,502 B2 * | 1/2011 | Balmin et al. | 707/713 |
| 7,865,515 B2 * | 1/2011 | Birka et al. | 707/759 |
| 7,877,381 B2 * | 1/2011 | Ewen et al. | 707/719 |
| 7,890,496 B2 * | 2/2011 | Li et al. | 707/713 |
| 7,908,259 B2 * | 3/2011 | Branscome et al. | 707/705 |
| 7,921,130 B2 * | 4/2011 | Hinshaw et al. | 707/769 |
| 7,945,577 B2 * | 5/2011 | Altinel et al. | 707/769 |
| 7,974,967 B2 * | 7/2011 | Scheuermann | 707/713 |
| 7,984,043 B1 * | 7/2011 | Waas | 707/718 |
| 8,051,422 B2 * | 11/2011 | Narita et al. | 718/104 |
| 8,126,870 B2 * | 2/2012 | Chowdhuri et al. | 707/713 |
| 8,166,022 B2 * | 4/2012 | Han et al. | 707/718 |
| 8,190,595 B2 * | 5/2012 | Bruno et al. | 707/713 |
| 8,392,403 B2 * | 3/2013 | Yu et al. | 707/718 |
| 8,538,985 B2 * | 9/2013 | Betawadkar-Norwood et al. | 707/770 |
| 8,745,036 B2 * | 6/2014 | Burger | 707/718 |
| 2001/0014914 A1 | 8/2001 | Muramatsu et al. | |
| 2003/0158842 A1 * | 8/2003 | Levy et al. | 707/3 |
| 2005/0119020 A1 | 6/2005 | Cheng et al. | |
| 2007/0180089 A1 | 8/2007 | Fok et al. | |
| 2008/0256167 A1 * | 10/2008 | Branson et al. | 709/201 |
| 2009/0150560 A1 | 6/2009 | Bestgen et al. | |
| 2009/0254916 A1 * | 10/2009 | Bose et al. | 718/104 |
| 2010/0005077 A1 * | 1/2010 | Krishnamurthy et al. | 707/4 |

FOREIGN PATENT DOCUMENTS

| | | |
|---|---|---|
| KR | 10-2007-012416 | 11/2007 |
| KR | 10-2008-0094083 | 10/2008 |
| WO | WO 2006/102506 | 9/2006 |

* cited by examiner

APPARATUS AND METHOD FOR PROCESSING A DATA STREAM

CROSS-REFERENCE TO RELATED APPLICATION(S)

This application claims the benefit under 35 U.S.C. §119 (a) of Korean Patent Application No. 10-2009-0123326, filed on Dec. 11, 2009, the disclosure of which is incorporated herein by reference in its entirety for all purposes.

BACKGROUND

1. Field

The following description relates to a Data Stream Management System (DSMS).

2. Description of the Related Art

A DataBase Management System (DBMS) is generally used to extract specific information from structured data. However, a new scheme of processing data has been newly developed with the emergence of new technologies such as a Sensor Network, Mobile Sensing and a Real Time Web. The new processing scheme dynamically corresponds to the data of the Sensor Network, the Mobile Sensing and Real Time Web that is continuously being streamed across a network.

The technology of handling dynamic data is referred to as Data Stream Processing, and also referred to as a Data Stream Management System (DSMS) which is in opposition to DBMS which handles static data.

Data Stream Processing has been used in particular industrial fields such as network monitoring and logistic monitoring using a radio frequency identification (RFID) or other particular specialized fields. However, recently, as personal terminals having a sensor attached thereto have become available on the open market, users now have a data stream based service. An example of such a data stream based service includes a service of reporting a traffic flow or population density using a mobile position sensor and a health care service using a biosensor attached to a personal terminal.

As described above, as the user easily receives a data stream based service, a system of processing a significant amount of continuously changing mass data stream suffers from a load of handling a large number of queries requested by users. In particular, a mobile position sensor based service needs to process all queries requested by users while monitoring a data stream on position information sent from a large number of mobiles devices.

SUMMARY

In one general aspect, there is provided an apparatus for processing a data stream, the apparatus comprising: a determination unit configured to determine a first part and a second part of a query execution plan on queries, the first part comprising a part to be executed in a terminal, the second part comprising a part to be executed in a server; a providing unit configured to provide the terminal with the first part; and a combining unit configured to combine a query execution result with the second part, the query execution result corresponding to the first part and being received from the terminal.

The apparatus may include that the determination unit is further configured to: estimate an operation cost, the operation cost being used to execute a query operator included in the query execution plan in the terminal; and determine the first part based on the estimated operation cost.

The apparatus may further include a terminal information storage unit configured to store terminal-related information comprising at least one of: identification information of the terminal, a Central Processing Unit (CPU) performance information of the terminal, a memory size of the terminal, and an access speed of the terminal to a network.

The apparatus may include that the operation cost is estimated based on the terminal-related information.

The apparatus may include that the combining unit is further configured to combine the query execution result corresponding to the first part with the second part based on the terminal-related information.

The apparatus may include that the query execution plan comprises: at least one query operator; and an execution order of the query operator.

In another general aspect, there is provided an apparatus for processing a data stream, the apparatus comprising: a receiving unit configured to receive a first part of a query execution plan on queries, the first part being determined as a part to be executed in a terminal; and a partial query execution part configured to: execute the first part of the query execution plan; and transmit a result of the execution to a server.

The apparatus may include that the partial query execution unit is further configured to transmit identification information of the terminal, together with the execution result, to the server.

The apparatus may include that the query execution plan comprises: at least one query operator; and an execution order of the query operator.

In another general aspect, there is provided an apparatus for processing a data stream based on a query execution plan for queries, the apparatus comprising: a data sensing terminal configured to execute a part of the query execution plan; and a data stream management server configured to: receive a result of the part of query execution plan from the data sensing terminal; and execute another part of the query execution plan based on the received result.

The apparatus may include that the data stream management server is configured to: estimate an operation cost of the data sensing terminal for executing query operators included in the query execution plan; and determine a part of the query execution plan based on the estimated operation cost, the part of the query execution plan to be executed in the data sensing terminal.

In another general aspect, there is provided a method of processing a data stream, the method comprising: at a server, determining a first part and a second part of a query execution plan on queries, the first part comprising a part to be executed in a terminal, the second part comprising a part to be executed in the server; at the server, providing the terminal with the first part; at the terminal: executing the first part; and transmitting a result of the execution to the server; and at the server, combining the result of execution with the second part.

The method may include that the determining of the first part and the second part comprises: estimating an operation cost of the terminal for executing query operators included in the query execution plan; and determining the first part based on the estimated operation cost.

The method may include that the operation cost is estimated based on at least one of: identification information of the terminal, Central Processing Unit (CPU) performance information of the terminal, a memory size of the terminal, and an access speed of the terminal to a network.

The method may include that, in the combining, the execution result of the first part is combined with the second part based on an identification information of the terminal.

Other features and aspects may be apparent from the following detailed description, the drawings, and the claims.

Figure 1:
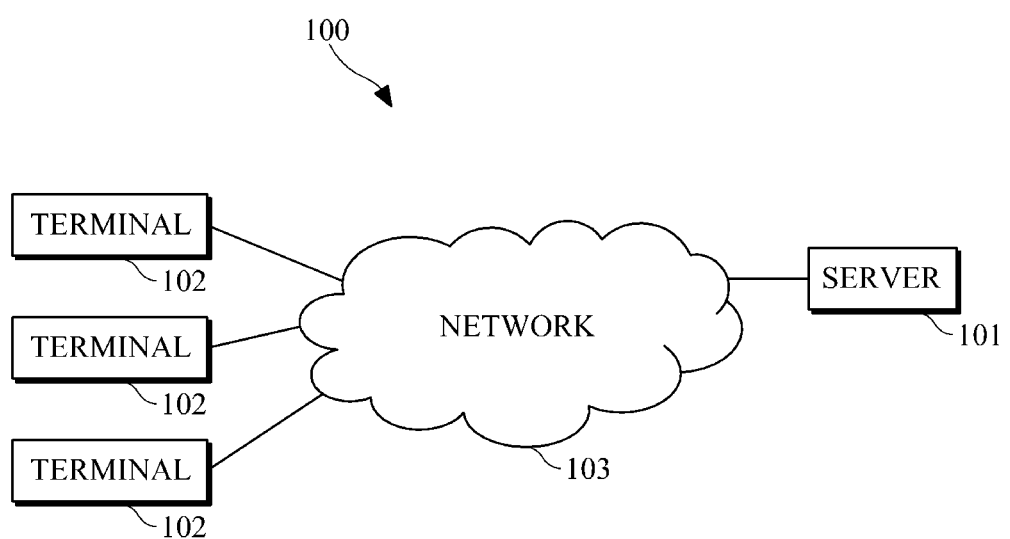
FIG. 1 illustrates an example of a data stream processing system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a data stream processing system.

As shown in FIG. 1, a data stream processing system 100 may include a server 101 and at least one terminal 102. The server 101 and the terminal 102 may exchange information with each other through a network 103.

The terminal 102 may include a sensor for sensing various types of data. The sensor may be a position sensor, a Global Positioning System (GPS) sensor, a speed sensor, a temperature sensor, etc. For example, the terminal 102 may be a mobile phone, a Personal Digital Assistants (PDA), a MP3-player, a laptop computer, or a health care device that is equipped with a sensor described above. The above list is not intended to be limiting.

The terminal 102 may transmit sensed data to the server 101. For example, if the terminal 102 is implemented as a mobile phone capable of GPS information, the terminal 102 may transmit GPS information to the server 101 at predetermined intervals.

The server 101 may be a data stream management server. The server 101 may analyze the data received from the terminal in real time and provides a user with information valuable to the user. For example, in response to a user's providing the server 101 with a question asking how many people are currently positioned in a predetermined area, the server 101 may notify the user of the number of people positioned in the predetermined area by analyzing GPS information received from the terminal 102.

The server 101 and the terminal 102 may process a query in cooperation with each other. The process of a query represents searching for information requested by a user and providing of the information. For example, information requested by a user may be obtained by filtering data of a large number of terminals 102 through a continuous query registered by the user.

In the above example, a query may correspond to the process of asking how many people are currently being positioned in a predetermined area, and processing of a query may correspond to the process of notifying the number of people currently being positioned in the corresponding area. The processing of a query may include a process of executing query operators according to a predetermined order.

That is, individual pieces of data streamed from a plurality of terminals 102 may be input to the server 101, and the server 101 may perform a stream mining and a continuous query process on a large amount of data stream input in real time.

According to the example of the data stream processing system, the cooperation between the server 101 and the terminal 102 may be implemented by sharing a query execution plan (QEP) between the server 101 and the terminal 102. The query execution plan may include at least one query operator and an execution order of the query operator.

The method of building a query execution plan is generally known in art. For example, the server 101 receives a query from a user, inspects an error by parsing the input query, and generates an optimum query execution plan in consideration of an operation cost for each query operator.

According to the example of the data stream processing system, a part of the query execution plan may be executed in the terminal 102 and another part may be executed in the server 101.

For example, the server 101 may determine a part of the entire query execution plan to be processed in the terminal 102 by analyzing the built query execution plan and may provide the determined part to the terminal 102. The terminal 102 may execute the received part of the entire query execution plan and may transmit a result of the execution to the server 101. The server 101 may execute the remaining part of the query execution plan using the result of execution received from the terminal 102.

As described above, when the server 101 and the terminal 102 share the query execution plan and each executes a part of the query execution plan, the processing load applied to the server 101 in order to process queries may be reduced.

Figure 2:
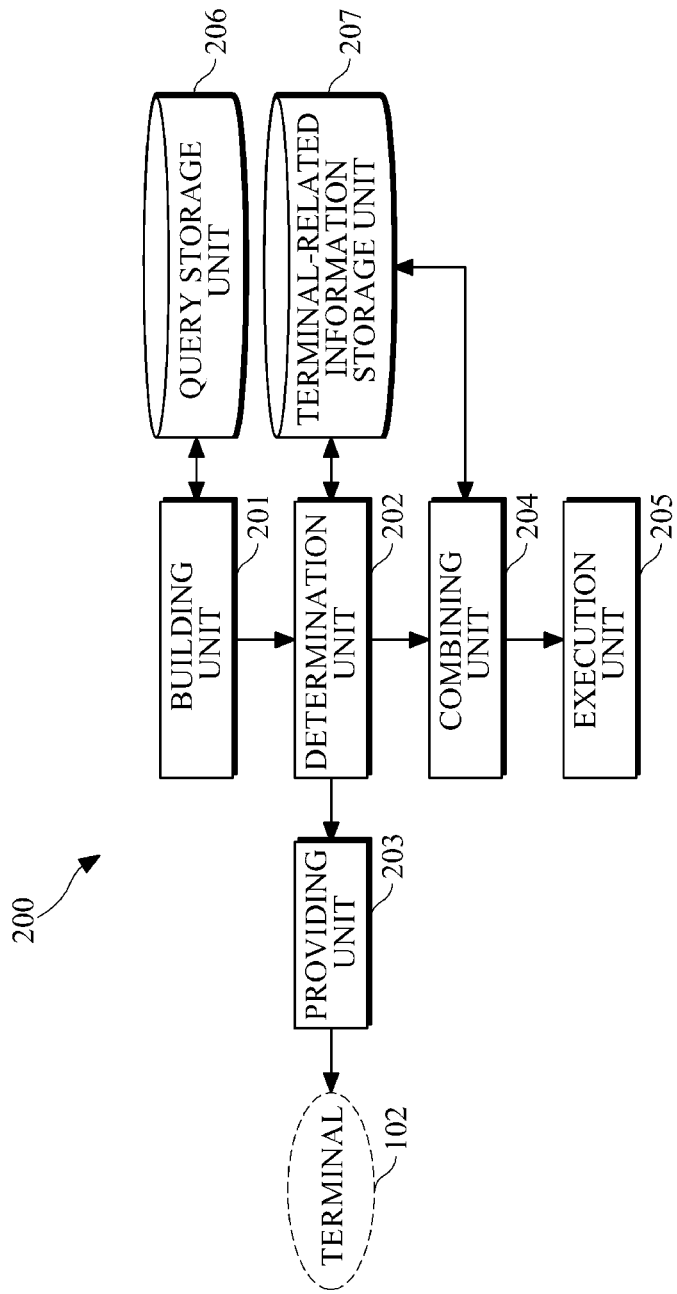
FIG. 2 illustrates an example of a data stream processing apparatus.

FIG. 2 illustrates an example of a data stream processing apparatus that may also be an example of the server 101 shown in FIG. 1.

As shown in FIG. 2, a data stream processing apparatus 200 may include a building unit 201, a determination unit 202, a providing unit 203, a combining unit 204, an execution unit 205, a query storage unit 206, and a terminal-related information storage unit 207.

The building unit 201 may build a query execution plan for queries. The queries may be registered by a user and stored in the query storage unit 206. The building unit 201 may perform a parsing or a validation test on the queries stored in the query storage unit 206 and may build an optimum query execution plan. The building of query execution plan represents a process of determining an execution order for query operators. Accordingly, the query execution plan may be represented as at least one query operator and an execution order of the query operator.

The determination unit 202 may determine a first part of the entire query execution plan to be executed in the terminal 102 and a second part of the entire query execution plan to be executed in the sever 101 by analyzing the built query execution plan. For example, the first part to be executed in the terminal 102 may be defined as a set of some query operators in the query execution plan and the second part to be executed in the server 101 may be defined as a set of remaining query operators in the query execution plan except for the first part.

The part of the entire query execution plan to be assigned to the terminal 102 may be determined in consideration of a computing power of the terminal 102. For example, the determination may be performed taking into consideration information about the performance of a Central Processing Unit (CPU) of the terminal 102, information about the memory size of the terminal 102, and information about access speed of the terminal 102 to a network that are stored in the terminal-related information storage unit 207. A detailed description thereof will be made later.

The providing unit 203 may provide the terminal 102 with the first part determined in the determination unit 202. For example, the proving unit 203 may provide the terminal 102 with a set of query operators corresponding to the first part.

The combining part 204 may receive a result of query execution corresponding to the first part included in the entire query execution plan from the terminal 102. The combining unit 204 may combine the received execution result with the second part. The combining unit 204 may combine the received execution result with the second part based on identification information of the terminal that is stored in the terminal-related information storage unit 207.

The execution unit 205 may execute the second part of the entire query execution plan. When the first part is executed in the terminal 102 and then combined with the second part, if the execution unit 205 may execute the second part, the entire query execution plan may be executed.

Figure 3:
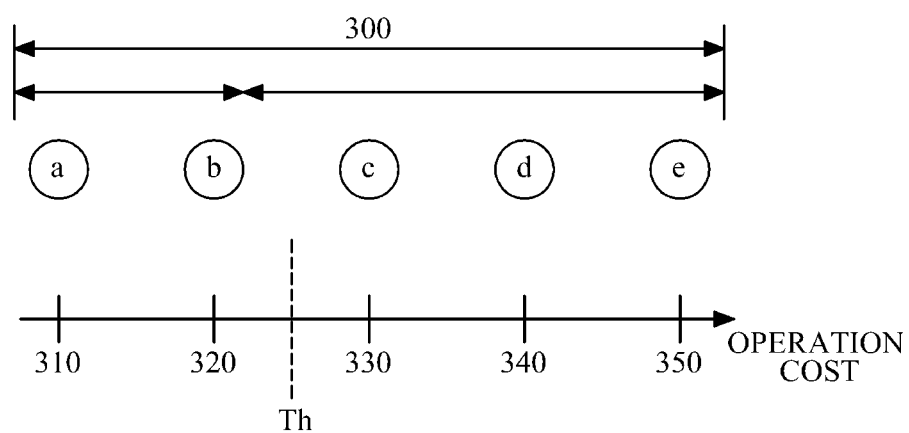
FIG. 3 illustrates an example of a query execution plan.

FIG. 3 illustrates an example of a query execution plan.

As shown in FIG. 3, (a), (b), (c), (d), and (e) represent query operators, such as a "select," "project," "join," and "union," and an arrow represents an execution order of the query operators.

A query execution plan 300 may be built by the building unit 201 and the query execution plan 300 may be built differently depending on the type of query, the terminal 102, and the type of data stream received from the terminal 102. For example, if a query is processed in different terminals, a different query execution plan may be built by each terminal even though the same query is processed.

Referring to FIG. 3, a method of determining a first part 301 in the determination unit 202 is described. For convenience, it may be presumed in one example that the query execution plan 300 is built to process a data stream received from at least one terminal 102.

The determination unit 202 may estimate an operation cost desired to execute a query operator in the terminal 102. For example, the estimated operation cost may include a first operation cost 310 desired when the terminal 102 only executes the operator (a), a second operation cost 320 desired when the terminal 102 executes operators (a) and (b), a third operation cost 330 desired when the terminal 102 executes operators (a), (b), and (c), a fourth operation cost 340 desired when the terminal 102 executes operators (a), (b), (c), and (d) and a fifth operation cost 350 desired when the terminal 102 executes operators (a), (b), (c), (d), and (e).

The determination unit 202 may determine the first part 301 by comparing the estimated operation cost with a threshold value. The threshold value may correspond to a limit value of the computing power of the terminal 102. For example, if the threshold value lies between the second operation cost 320 and the third operation cost 330, the limit value of the computing power of the terminal 102 may be set for when operators (a) and (b) are executed. In one example, the determination unit 202 may determine the operators (a) and (b) as the first part 301 of the entire query execution plan 300. In addition, the determination unit 202 may determine the remaining part of the entire query execution plan 300 except for the first part 301 as the second part 302.

The operation cost may be estimated based on CPU performance information of the terminal 102, information about a memory size of the terminal 102, and information about an access speed of the terminal 102 to a network. The information about the terminal 102 may be transmitted from the terminal 102 to the server 101, or may be input by a user of the server 101 with reference to a device catalog of the terminal 102.

As described above, as the query execution plan 300 may be built differently based on a data stream and the performance of a terminal which differs from terminal to terminal, the first part 301 of the query execution plan 300 may differ from terminal to terminal.

Figure 4:
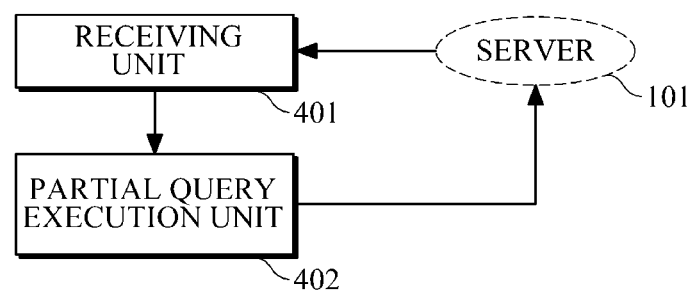
FIG. 4 illustrates another example of a data stream processing apparatus.

FIG. 4 illustrates another example of a data stream processing apparatus that may be also an example of the terminal 102 shown in FIG. 1.

As shown FIG. 4, a data stream processing apparatus 400 may include a receiving unit 401 and a partial query execution unit 402.

The receiving unit 401 may receive a first part that is included in the entire query execution plan and is determined as a part to be executed in the terminal. For example, the receiving part 401 may receive the operators (a) and (b) shown in FIG. 3 or an execution instruction for executing the query operators (a) and (b).

The partial query execution unit 402 may execute the first part of the entire query execution plan and may transmit a result of the execution to the server. For example, the receiving unit 401 may execute the operators (a) and (b) included in the entire query execution plan 300 and transmit a result of the execution to the server.

The partial query execution unit 402 may transmit the execution result to the server 101 together with identification information of the terminal 102. The identification information of the terminal 102 transmitted together with the execution result may serve as a criterion that may be used when determining a terminal from which the data corresponding to the execution result of the partial query execution unit 402 is streamed.

According to one example, the data stream processing apparatus 400 may further include a front-end processor to remove errors from sensed data and maintain a raw data stream at a predetermined level.

Figure 5:
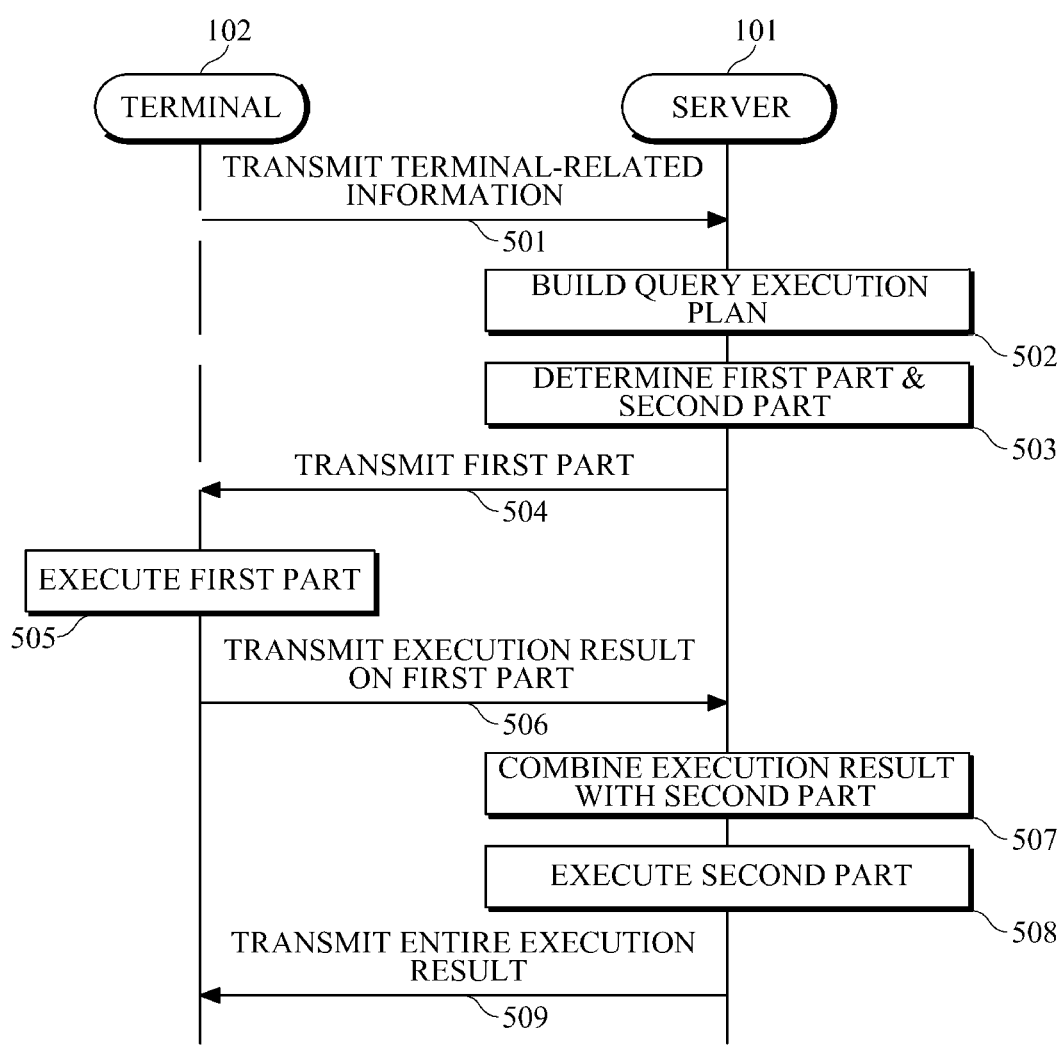
FIG. 5 illustrates an example of a data stream processing method.

FIG. 5 illustrates an example of a data stream processing method.

As shown in FIG. 5, in operation 501, the terminal 102 may transmit terminal-related information to the server 101. The terminal-related information may include at least one of: identification information of the terminal 102, performance information of a Central Processing Unit (CPU) of the terminal 102, the memory size of the terminal 102, and the access speed of the terminal 102 to a network. The transmitted terminal-related information may be stored in the server 101.

Alternatively, the terminal 102 may not transmit terminal-related information and a server administrator of the server may directly input terminal-related information with reference to the specification of hardware stated in a catalog of the terminal 102.

Meanwhile, in operation 502, the server 101 may build a query execution plan for registered queries. The query execution plan may include at least one query operator and an execution order of the query operator. The query execution plan may be built differently depending on the type of query, the type of terminal, and the type of data stream received from a terminal.

In operation 503, the server 101 may determine a part of the query execution plan to be executed in the terminal 102 and a part of the query execution plan to be executed in the server 101. For example, the determination unit 202 may determine the first part 301 and the second part 302 of the query execution plan 300. The first part 301 and the second part 302 may be determined by comparing a threshold value with an operation cost that is estimated based on performance information, such as a CPU performance of the terminal, a memory size of the terminal, and an access speed of the terminal to a network, among the stored terminal-related information.

In operation 504, the server 101 may transmit to the terminal 102 the first part 301 to be executed by the terminal 102. For example, the providing unit 203 may provide the terminal 101 with a query operator corresponding to the first part 301, or provide the terminal 101 with an execution instruction allowing the terminal 102 to execute a query operator corresponding to the first part 301.

In operation 505, the terminal, having received the first part 301, may execute a query operator corresponding to the first part 301. For example, the partial query execution unit 402 may execute some part of the entire query execution plan.

In operation 506, the terminal 102 may transmit an execution result on the first part 301 to the server 101. For example, the terminal 102 may execute query operators ⓐ and ⓑ and transmit a result of execution to the server. In addition, the terminal 102 may transmit its own identification information together with the result of execution.

In operation 505, the server 101, having received the query execution result corresponding to the first part 301, may combine the execution result with the second part 302. In one example, the server 101 may determine a terminal, from which the execution result is generated, based on identification information of the terminal 102 of the stored terminal-related information.

In operation 508, in response to the execution result transmitted from the terminal 102, the server 101 may execute the second part 302 corresponding to the remaining part of the entire query execution plan 300. In operation 509, the server 101 may transmit a result of execution of the entire query execution plan 300 to the terminal 102.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing a data stream, the apparatus comprising:
   a determination unit configured to:
      determine a first part and a second part of a query execution plan shared between a server and a terminal, the first part comprising a part to be executed by the terminal served by the server, and the second part comprising a part to be executed by the server,
      estimate an operation cost, the operation cost corresponding to a computing capacity of the terminal enabling execution of a query operator of the query execution plan by the terminal,
      set a respective execution threshold for execution of the query operator by the terminal, corresponding to a maximum computing capacity enabling execution of the query operator by the terminal and being based on the estimating of the operation cost at the terminal; and
      determine the first part based on the estimated operation cost;
   a transmitter configured to transmit the first part to the terminal; and
   a combining unit configured to receive a query execution result of the first part from the terminal and to combine the received query execution result with the second part, wherein execution of the second part is based on an actual operation cost of executing the query operator at the terminal compared to the estimated operation cost.

2. The apparatus of claim 1, further comprising a terminal information storage unit configured to store terminal-related information comprising at least one of: identification information of the terminal, Central Processing Unit (CPU) performance information of the terminal, a memory size of the terminal, and an access speed of the terminal to a network.

3. The apparatus of claim 2, wherein the operation cost is estimated based on the terminal-related information.

4. The apparatus of claim 2, wherein the combining unit is further configured to combine the query execution result corresponding to the first part with the second part based on the terminal-related information.

5. The apparatus of claim 1, wherein the query execution plan comprises:
   at least one query operator; and
   an execution order of the query operator.

6. The apparatus of claim 1, wherein the first part of the query execution plan transmitted by the apparatus to the terminal comprises a first set of query operators to be performed by the terminal and the second part of the query execution plan comprises a second set of query operators to be performed by the server.

7. An apparatus for processing a data stream, the apparatus comprising:

a receiver configured to receive a first part of a query execution plan shared between a server and a terminal from the server, the first part being determined as a part to be executed by the terminal served by the server based on an estimated operation cost; and a partial query execution unit configured to execute the first part of the query execution plan and transmit a result of the execution to the server, wherein the query execution plan comprises a query operator, an indication of a location within an execution sequence for executing the query operator, and the estimated operation cost, which corresponds to a computing capacity of the terminal enabling execution of the query operator of the query execution plan by the terminal, wherein the first part is executed within a respective execution threshold for the query operator, set by the server and the corresponding to maximum computing capacity enabling execution of the query operator by the terminal, and based on the estimation of the operation cost at the terminal; and wherein execution of a part of the query execution plan shared by the server is based on an actual operation cost of executing the query operator at the terminal compared to the estimated operation cost.

8. The apparatus of claim 7, wherein the partial query execution unit is further configured to transmit identification information of the terminal, together with the execution result, to the server.

9. A system for processing a data stream based on a query execution plan for queries, the system comprising:

a data sensing terminal that is served by a data stream management server, the data sensing terminal being configured to execute a part of the query execution plan that is determined by and received from the data stream management server, and in which the execution of the query execution plan is shared between the server and the data sensing terminal; and the data stream management server configured to:
receive a result of the part of query execution plan from the data sensing terminal,
execute another part of the query execution plan based on the received result, and
estimate an operation cost of the data sensing terminal corresponding to a computing capacity of the data sensing terminal enabling execution of query operators of the query execution plan, and
set a respective execution threshold for the part of the execution plan transmitted to the data sensing terminal corresponding to a maximum computing capacity enabling execution of the part of the query execution plan transmitted to the data sensing terminal, based on the estimating of the operation cost at the terminal,
wherein execution of a part of the query execution plan shared by the server is based on an actual operation cost of executing the part of the query execution plan at the data sensing terminal compared to the estimated operation cost.

10. The system of claim 9, wherein the data stream management server is configured to:
determine the part of the query execution plan to be executed in the data sensing terminal based on the estimated operation cost, the part of the query execution plan to be executed in the data sensing terminal.

11. A method of processing a data stream, the method comprising:
at a server, determining a first part and a second part of a query execution plan shared between the server and a terminal, the first part comprising a part that is to be executed in the terminal that is served by the server and the second part comprising a part to be executed by the server,
wherein the determining of the first part and the second part comprises estimating an operation cost of the terminal corresponding to a computing capacity of the terminal enabling execution of at least one query operator of the query execution plan, setting a respective execution threshold for execution of query operators by the terminal corresponding to a maximum computing capacity enabling execution of the at least one query operator by the terminal, based on the estimating of the operation cost at the terminal, and determining the first part based on the estimated operation cost;
at the server, transmitting the first part to the terminal;
at the terminal, executing the first part and transmitting a result of the execution to the server; and
at the server, combining the result of execution of the first part with the second part,
wherein execution of the second part is based on an actual operation cost of executing the at lest one query operator at the terminal compared to the estimated operation cost.

12. The method of claim 11, wherein the operation cost is estimated based on at least one of: identification information of the terminal, Central Processing Unit (CPU) performance information of the terminal, a memory size of the terminal, and an access speed of the terminal to a network.

13. The method of claim 11, wherein, in the combining, the execution result of the first part is combined with the second part based on identification information of the terminal.

* * * * *